United States Patent
Kim et al.

(10) Patent No.: US 8,878,822 B2
(45) Date of Patent: Nov. 4, 2014

(54) MOBILE TERMINAL AND METHOD OF CONTROLLING OPERATION OF THE MOBILE TERMINAL

(75) Inventors: Jonghwan Kim, Seoul (KR); Hyunho Jee, Seoul (KR); Youngwoo Kim, Seoul (KR); Seonhwi Cho, Seoul (KR); Hojun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 551 days.

(21) Appl. No.: 13/169,904

(22) Filed: Jun. 27, 2011

(65) Prior Publication Data
US 2012/0027267 A1 Feb. 2, 2012

(30) Foreign Application Priority Data
Jul. 29, 2010 (KR) .................. 10-2010-0073611

(51) Int. Cl.
*G06F 3/041* (2006.01)
*G06F 3/0488* (2013.01)

(52) U.S. Cl.
CPC ............ *G06F 3/0488* (2013.01); *G06F 3/0418* (2013.01)
USPC .......................................... 345/178; 345/419

(58) Field of Classification Search
CPC .......................... G06F 3/0418; H04N 13/0022
USPC .................................................. 345/173, 178
See application file for complete search history.

(56) References Cited

U.S. PATENT DOCUMENTS

| | | | |
|---|---|---|---|
| 5,565,894 A * | 10/1996 | Bates et al. .................... | 345/178 |
| 6,243,054 B1 | 6/2001 | DeLuca | |
| 6,559,813 B1 | 5/2003 | DeLuca et al. | |
| 7,593,000 B1 | 9/2009 | Chin | |
| 2005/0089212 A1 * | 4/2005 | Mashitani et al. ............ | 382/154 |
| 2005/0248529 A1 * | 11/2005 | Endoh ........................... | 345/156 |
| 2009/0093276 A1 * | 4/2009 | Kim et al. ..................... | 455/566 |
| 2010/0188355 A1 * | 7/2010 | Sugita et al. .................. | 345/173 |
| 2011/0141108 A1 * | 6/2011 | Masuda ........................ | 345/419 |
| 2011/0164029 A1 * | 7/2011 | King et al. .................... | 345/419 |

FOREIGN PATENT DOCUMENTS

| | | |
|---|---|---|
| CN | 1694056 A | 11/2005 |
| CN | 201392537 Y | 1/2010 |
| EP | 2045704 A2 | 4/2009 |
| EP | 2 144 148 A2 | 1/2010 |
| WO | WO 2010/023887 A1 | 3/2010 |

* cited by examiner

*Primary Examiner* — Dorothy Harris
(74) *Attorney, Agent, or Firm* — Birch, Stewart, Kolasch & Birch, LLP

(57) ABSTRACT

According to an embodiment of the present invention, a method of controlling the operation of a mobile terminal includes displaying, on a display module of the mobile terminal, a stereoscopic three-dimensional (3D) image using a disparity between left-eye and right-eye images, receiving a touch input within the stereoscopic 3D image, determining whether a position of the touch input is received within a first area, a second area or a third area, wherein the right-eye image is displayed in the first area, the left-eye image is displayed in the second area, and the third area is the overlapping area of the left-eye and right-eye images, and correcting a touch-sensing area on the display module according to the position of the received touch input, wherein the touch-sensing area receives a touch for selecting the stereoscopic 3D image.

7 Claims, 14 Drawing Sheets

MOBILE TERMINAL AND METHOD OF CONTROLLING OPERATION OF THE MOBILE TERMINAL

CROSS-REFERENCE TO RELATED APPLICATION

This application claims the priority benefit of Korean Patent Application No. 10-2010-0073611, filed on Jul. 29, 2010 in the Korean Intellectual Property Office, the disclosure of which is incorporated herein by reference.

BACKGROUND OF THE INVENTION

1. Field of the Invention

The present invention relates to a mobile terminal and a method of controlling the operation of the mobile terminal, and more particularly, to a mobile terminal and a method of controlling the operation of the mobile terminal, in which a touch-sensing area for a stereoscopic three-dimensional (3D) image can be corrected according to the dominant eye of a user.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals has steadily grown due to a growing tendency of considering mobile terminals as personal items that can represent personal individuality.

In the meantime, stereoscopic three-dimensional (3D) imaging, which is a technique of combining multiple images captured by a camera to create a stereoscopic 3D image, have recently become commonplace. When applied to mobile terminals, stereoscopic 3D imaging can allow the users to create stereoscopic 3D images using the cameras of the mobile terminals and to display various stereoscopic 3D images on the displays of the mobile terminals. Stereoscopic 3D images can be displayed on the displays of mobile terminals using various methods such as auto-stereoscopy, which is also called glasses-free 3D.

People tend to touch on different parts of a stereoscopic 3D image to select the stereoscopic 3D image according to whether they are left-eyed, right-eyed or both. Therefore, it is necessary to appropriately correct a touch-sensing area, i.e., an area within which the presence and location of a touch for selecting a stereoscopic 3D image can be sensed, according to the dominant eye of a user.

SUMMARY OF THE INVENTION

The present invention provides a mobile terminal and a method of controlling the operation of the mobile terminal, in which a touch-sensing area for a stereoscopic three-dimensional (3D) image can be corrected according to the dominant eye of a user.

According to an aspect of the present invention, there is provided a method of controlling the operation of a mobile terminal, the method including displaying a stereoscopic 3D image on a display module using the disparity between left- and right-eye images; if a touch is detected within the stereoscopic 3D image, determining whether a position of the detection of the touch falls within a first area, in which the right-eye image is displayed, a second area, in which the left-eye image is displayed or a third area, which is the overlapping area of the left- and right-eye images; and correcting a touch-sensing area set on the display module according to whether the position of the detection of the touch falls within the first, second or third area, the touch-sensing area being an area within which a touch for selecting the stereoscopic 3D image can be sensed.

According to another aspect of the present invention, there is provided a mobile terminal including a display module configured to display a stereoscopic 3D image thereon using the disparity between left- and right-eye images; and a controller configured to, upon the detection of a touch within the stereoscopic 3D image, determine whether a position of the detection of the touch falls within a first area, in which the right-eye image is displayed, a second area, in which the left-eye image is displayed, or a third area, which is the overlapping area of the left- and right-eye images, and correct a touch-sensing area set on the display module according to whether the position of the detection of the touch falls within the first, second or third area, the touch-sensing area being an area within which a touch for selecting the stereoscopic 3D image can be sensed.

According to another aspect of the present invention, there is provided a method of controlling the operation of a mobile terminal, the method including switching the mobile terminal to a lock mode; if a user input for releasing the mobile terminal from the lock state is received from a user, determining whether the user is already registered in the mobile terminal; and if the user is yet to be registered in the mobile terminal, correcting a touch-sensing area set on a display module and releasing the mobile terminal from the lock state, the touch-sensing area being an area within which a touch for selecting the stereoscopic 3D image can be sensed.

According to another aspect of the present invention, there is provided a mobile terminal including a display module configured to display an operation screen thereon; and a controller configured to switch the mobile terminal to a lock mode, wherein, if a user input for releasing the mobile terminal from the lock state is received from a user, the controller is configured to determine whether the user is already registered in the mobile terminal, and to correct a touch-sensing area set on a display module and release the mobile terminal from the lock state if the user is yet to be registered in the mobile terminal, the touch-sensing area being an area within which a touch for selecting the stereoscopic 3D image can be sensed.

According to an embodiment of the present invention, a method of controlling the operation of a mobile terminal includes displaying, on a display module of the mobile terminal, a stereoscopic three-dimensional (3D) image using a disparity between left-eye and right-eye images, receiving a touch input within the stereoscopic 3D image, determining whether a position of the touch input is received within a first area, a second area or a third area, wherein the right-eye image is displayed in the first area, the left-eye image is displayed in the second area, and the third area is the overlapping area of the left-eye and right-eye images, and correcting a touch-sensing area on the display module according to the position of the received touch input, wherein the touch-sensing area receives a touch for selecting the stereoscopic 3D image.

According to an embodiment of the present invention, a mobile terminal includes a display module configured to display a stereoscopic three-dimensional (3D) image using a disparity between left-eye and right-eye images, and a controller configured to receive a touch input within the stereoscopic 3D image, to determine whether a position of the touch input is received within a first area, a second area, or a third area, and to correct a touch-sensing area on the display module according to the position of the touch input, wherein the right-eye image is displayed in the first area, the left-eye image is displayed in the second area, and the third area is the overlapping area of the left-eye and right-eye images, and wherein the touch-sensing area receives a touch for selecting the stereoscopic 3D image.

According to an embodiment of the present invention, a method of controlling the operation of a mobile terminal includes switching the mobile terminal to a lock mode, receiving, on a display module of the mobile terminal from a user, a user input for releasing the mobile terminal from the lock mode, determining whether a user is already registered in the mobile terminal if the user input for releasing the mobile terminal from the lock mode is received, and if the user is yet to be registered in the mobile terminal, correcting a touch-sensing area on the display module and releasing the mobile terminal from the lock state, wherein the touch-sensing area receives a touch for selecting the stereoscopic three-dimensional (3D) image.

According to an embodiment of the present invention, a mobile terminal includes a display module configured to display an operation screen, and a controller configured to switch the mobile terminal to a lock mode, to receive a user input for releasing the mobile terminal from the lock mode, to determine whether a user is already registered in the mobile terminal if the user input for releasing the mobile terminal is received, and to correct a touch-sensing area on a display module and release the mobile terminal from the lock mode if the user is yet to be registered in the mobile terminal, wherein the touch-sensing area receives a touch for selecting the stereoscopic three-dimensional (3D) image.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), a camera, a navigation device, a tablet computer, or an electronic book (e-book) reader. In this disclosure, the terms 'module' and 'unit' can be used interchangeably.

Figure 1:
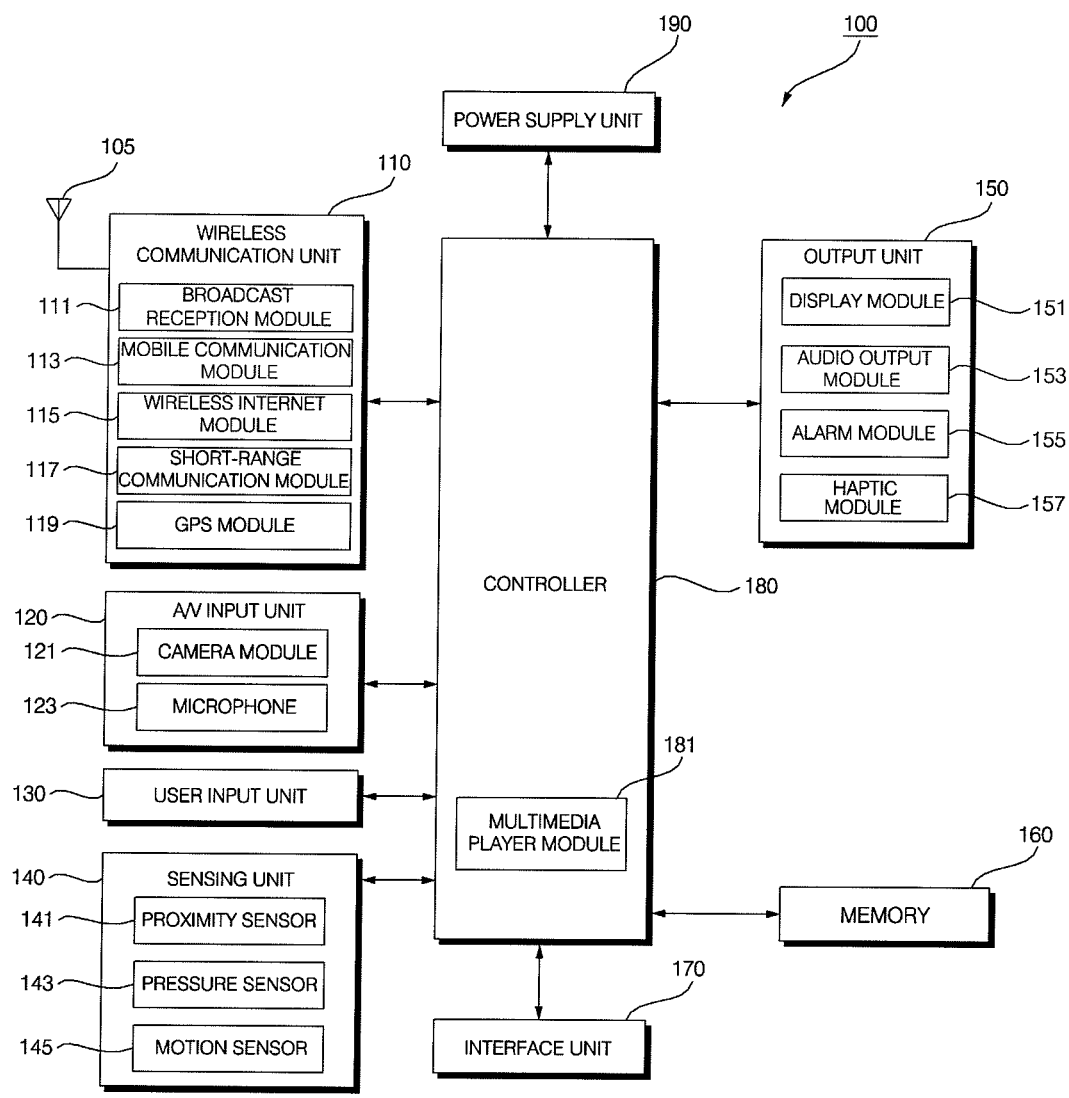
FIG. 1 is a block diagram of a mobile terminal according to an exemplary embodiment of the present invention.

FIG. 1 is a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, if the user input unit 130 is implemented as a touch pad and forms a mutual layer structure with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143 and a motion sensor 145. The detection sensor 141 may determine whether there is an object nearby and approaching the mobile terminal 100 without any mechanical contact with the entity. More specifically, the detection sensor 141 may detect an object that is nearby and approaching by detecting a change in an alternating magnetic field or the rate of change of static capacitance. The sensing unit 140 may include two or more detection sensors 141.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the Internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior structure of the mobile terminal 100 will hereinafter be described in detail with reference to FIGS. 2 and 3. The present invention can be applied to nearly all types of mobile terminals such as a folder-type, a bar-type, a swing-type and a slider-type mobile terminal. However, for convenience, it is assumed that the mobile terminal 100 is a bar-type mobile terminal equipped with a full touch screen.

Figure 2:
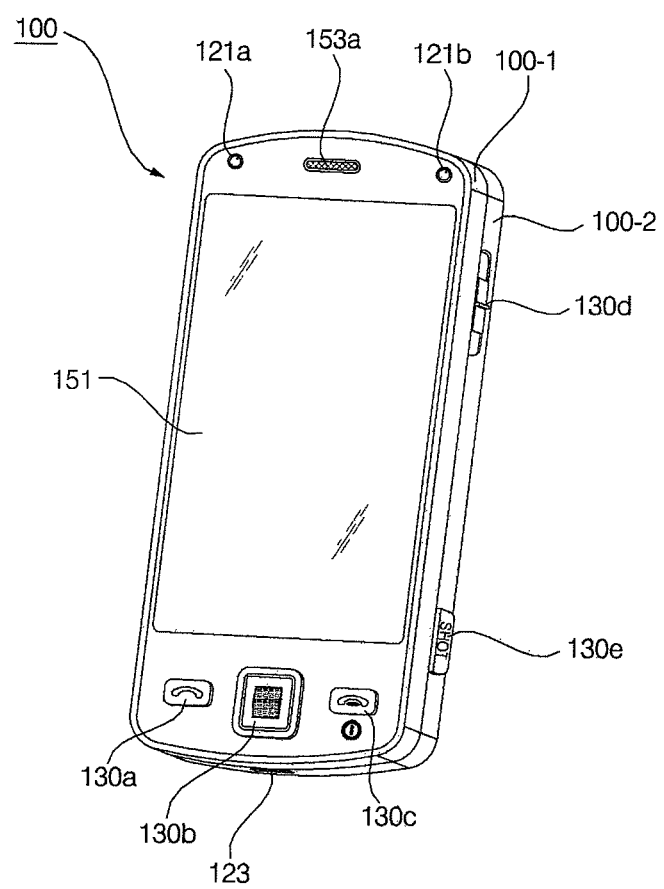
FIG. 2 is a front perspective view of the mobile terminal shown in FIG. 1.
Figure 3:
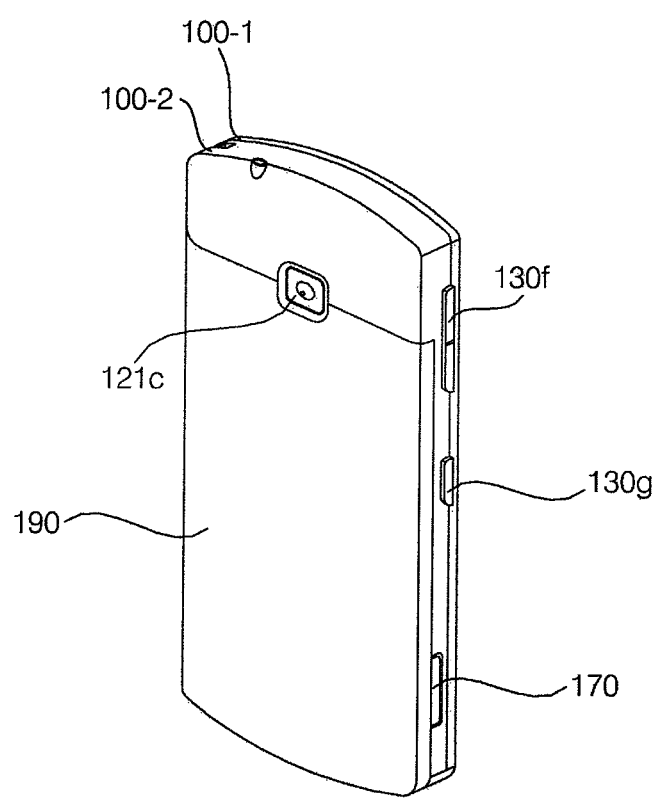
FIG. 3 is a rear perspective view of the mobile terminal shown in FIG. 2.

FIG. 2 is a front perspective view of the mobile terminal 100, and FIG. 3 is a rear perspective view of the mobile terminal 100. Referring to FIG. 2, the exterior of the mobile terminal 100 may be formed by a front case 100-1 and a rear case 100-2. Various electronic devices may be installed in the space formed by the front case 100-1 and the rear case 100-2. The front case 100-1 and the rear case 100-2 may be formed of a synthetic resin through injection molding. Alternatively, the front case 100-1 and the rear case 100-2 may be formed of a metal such as stainless steel (STS) or titanium (Ti).

The display module 151, a first audio output module 153*a*, a first camera 121*a*, and first through third user input modules 130*a* through 130*c* may be disposed in the main body of the mobile terminal 100, and particularly, on the front case 100-1. Fourth and fifth user input modules 130*d* and 130*e* and the microphone 123 may be disposed on one side of the rear case 100-2.

If a touch pad is configured to overlap the display module 151 and thus to form a mutual layer structure, the display module 151 may serve as a touch screen. Thus, the user can enter various information to the mobile terminal 100 simply by touching the display module 151.

The first audio output module 153*a* may be implemented as a receiver or a speaker. The first camera 121*a* may be configured to be suitable for capturing a still or moving image of the user. The microphone 123 may be configured to properly receive the user's voice or other sounds.

The first through fifth user input modules 130*a* through 130*e* and sixth and seventh user input modules 130*f* and 130*g* may be collectively referred to as the user input unit 130, and any means can be employed as the first through seventh user input modules 130*a* through 130*f* so long as it can operate in a tactile manner. For example, the user input unit 130 may be implemented as a dome switch or a touch pad that can receive a command or information according to a pressing or a touch operation by the user, or may be implemented as a wheel or jog type for rotating a key or as a joystick. In terms of function, the first through third user input modules 130*a* through 130*c* may operate as function keys for entering a command such as start, end, or scroll, the fourth user input module 130*d* may operate as a function key for selecting an operating mode for the mobile terminal 100, and the fifth user input module 130*e* may operate as a hot key for activating a special function within the mobile terminal 100.

Referring to FIG. 3, two cameras, i.e., second and third cameras 121*b* and 121*c*, may be additionally provided at the rear of the rear case 100-2, and the sixth and seventh user input modules 130*f* and 130*g* and the interface unit 170 may be disposed on one side of the rear case 100-2.

The second camera 121*b* may have an image capture direction which is substantially the opposite to that of the first camera 121*a*, and may have a different resolution from that of the first camera 121*a*. Another camera may be additionally installed near the second camera 121*b* and may thus be used for capturing a stereoscopic 3D image.

A flash and a mirror may be disposed to be adjacent to the second camera 121*b*. When an image of a subject is captured with the second camera 121*b*, the flash may illuminate the subject. The mirror may allow the user to see him- or herself when he or she wants to capture his or her own image by using the second camera 121*b*.

Another audio output module (not shown) may be additionally provided on the rear case 100-2. The audio output module on the rear case 100-2 may realize a stereo function along with the audio output module 153 on the front case 100-1. The audio output module on the rear case 100-2 may also be used in a speaker-phone mode.

The interface unit 170 may used as a passage allowing the mobile terminal 100 to exchange data with an external device either through a fixed line or wirelessly.

A broadcast signal reception antenna may be disposed at one side of the front or rear case 100-1 or 100-2, in addition to an antenna used for call communication. The broadcast signal reception antenna may be installed such that it can be extended from the front or rear case 100-1 or 100-2.

The power supply unit 190 may be mounted on the rear case 100-2 and may supply power to the mobile terminal 100. The power supply unit 190 may be, for example, a chargeable battery which can be detachably combined to the rear case 100-2 for being charged.

The second camera 121*b* and the other elements that have been described as being provided on the rear case 100-2 may be provided on the front case 100-1. In addition, the first camera 121*a* may be configured to be rotatable and thus to allow image capturing in various directions. In this case, the second camera 121*b* may be optional.

In exemplary embodiments of the present invention, a touch-sensing area, which is an area within which the presence and location of a touch for selecting a stereoscopic 3D image can be sensed, may be corrected according to the dominant eye of a user. If the right eye of the user is the dominant eye, it means that the user is a right-eyed person who relies more on visual signals received from the right eye than on visual signals received from the left eye. If the left eye of the user is the dominant eye, it means that the user is a left-eyed person who relies more on visual signals received from the left eye than on visual signals received from the right eye. If the left and right eyes of the user are both dominant, it means that the user is both-eyed. Statistics show that about 80% of the population is right-eyed and the rest are left-eyed or both-eyed.

One can easily determine whether he or she is left-eyed, right-eyed or both-eyed by forming a triangle with the thumbs and the index fingers, looking through the triangle at a distance object with both eyes open, and then closing one eye without moving the hands. Then, if the object is still visible, the open eye is dominant. If the object seems to disappear behind the fingers, the closed eye is dominant.

3D imaging is a technique for creating the illusion of depth in an image and thus providing viewers with a vivid sense of reality. The two eyes are about 65 mm apart from each other. Thus, when each of the two eyes is presented with different 2D images of the world, the 2D images are projected onto the retinas of the two eyes, and the brain extracts depth from the 2D retinal images using binocular disparity, which results from the horizontal separation of the two eyes and is one of the most important factors that should be considered when designing a 3D display device.

There are various methods of displaying a 3D image such as a stereoscopic display method, which is a method of displaying a 3D image with the use of glasses, an auto-stereoscopic display method, which is a method of displaying a 3D image without the use of glasses and is also called glasses-free 3D, and a projection method, which uses holography. The stereoscopic display method is generally used in home TV sets, and the auto-stereoscopic display method is generally used in mobile terminals.

Examples of the auto-stereoscopic display method include, but are not limited to a lenticular display method, a parallax barrier method and a parallax illumination method. The lenticular display method involves using a sheet of hemispherical lenticular lenses to the front of a device that displays left- and right-eye images. The parallax barrier display method involves projecting left- and right-eye images through a parallax barrier. The parallax illumination method involves placing an illumination plate behind an LCD so as to make alternate columns of pixels visible to the left and right eyes. Research is being conducted on various stereoscopic 3D imaging technique, other than those set forth herein, using several factors that can create the sense of three-dimensionality.

Figure 4:
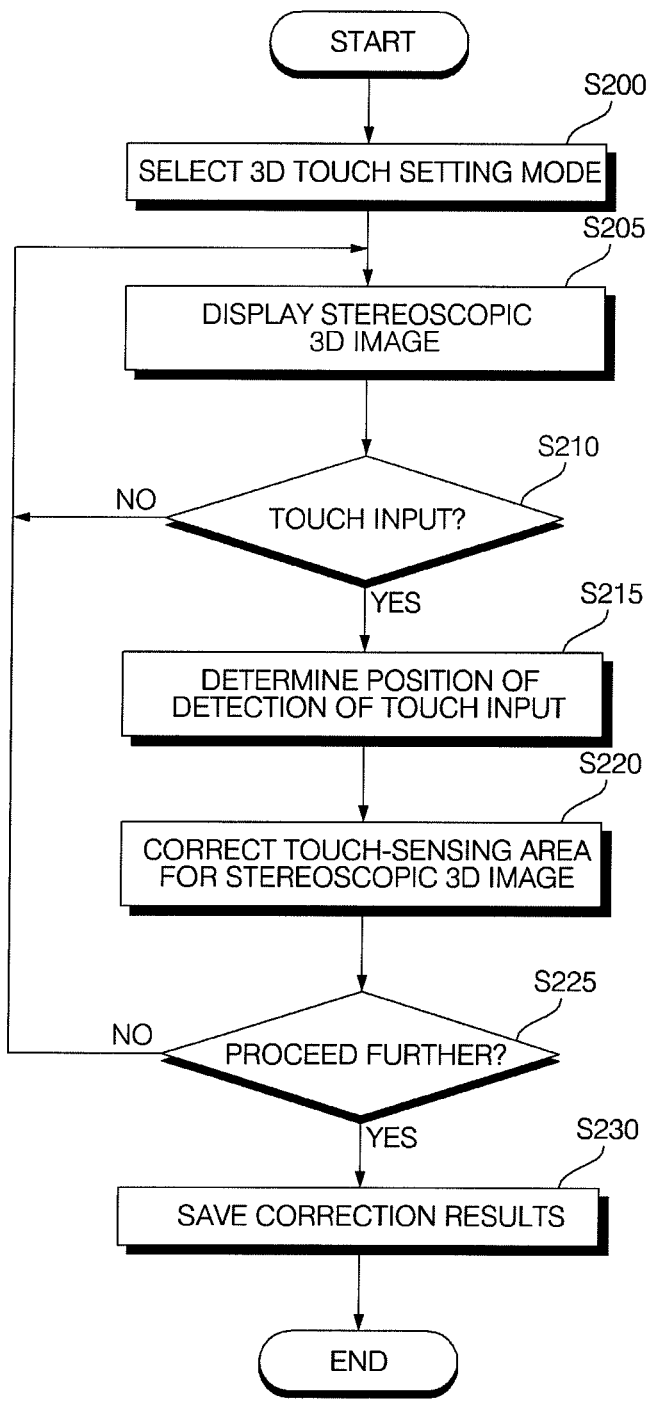
FIG. 4 is a flowchart illustrating a method of controlling the operation of a mobile terminal, according to an exemplary embodiment of the present invention.

FIG. 4 is a flowchart illustrating a method of controlling the operation of a mobile terminal, according to an exemplary embodiment of the present invention. Referring to FIG. 4, if a 3D touch setting mode for correcting a touch-sensing area for a stereoscopic 3D image is selected in response to, for example, a user command (S200), the controller 180 may display a stereoscopic 3D image on the display module 151 using the binocular disparity between left- and right-eye images (S205). The stereoscopic 3D image may be an image of a circular shape, a cross, a touch key and an icon.

Thereafter, if a touch input for selecting the stereoscopic 3D image is detected from the display module 151 (S210), the controller 180 may determine whether the point of the detection of the touch input falls within an area (hereinafter referred to as the right-eye image area) where the right-eye image is displayed, an area (hereinafter referred to as the left-eye image area) where the left-eye image is displayed or the overlapping area of the left- and right-eye image areas (S215). Thereafter, the controller 180 may correct a touch-sensing area based on the results of the determination performed in operation S215 (S220).

Operations S215 and S220 may be performed differently according to the dominant of a user. For example, if the right eye of the user is the dominant eye, the user is highly likely to touch the right-eye image area. On the other hand, if the left eye of the user is the dominant eye, the user is highly likely to touch the left-eye image area. Thus, if the user touches on the right-eye image area, the controller 180 may determine that the right eye of the user is the dominant eye, and may thus set a new touch-sensing area based on the right-eye image area. If the user touches on the left-eye image area, the controller 180 may determine that the left eye of the user is the dominant eye, and may thus set a new touch-sensing area based on the left-eye image area. If the user touches on the overlapping area of the right- and left-eye image areas, the controller 180 may determine that the left and right eyes of the user are both dominant, and may thus set a new touch-sensing area based on the overlapping area of the right- and left-eye image areas.

Since the precision of correction of a touch-sensing area does not increase beyond a certain level even after repeated corrections, the correction of the touch-sensing area may be performed only a predefined number of times (S225). During repeated corrections of the touch-sensing area, the same stereoscopic 3D image or different stereoscopic 3D images may be used, or the same stereoscopic 3D image may be used while varying the location thereof. If the user wishes to not perform the correction of the touch-sensing area any more (S225), the controller 180 may store the results of the correction performed in operation S220 in the memory 160 (S230).

When there is a need to display a stereoscopic 3D image afterwards, a new touch-sensing area may be set based on the results of the correction performed in operation S220. In this manner, it is possible to effectively correct a touch-sensing area for a stereoscopic 3D image according to the dominant eye of the user.

Figure 5:
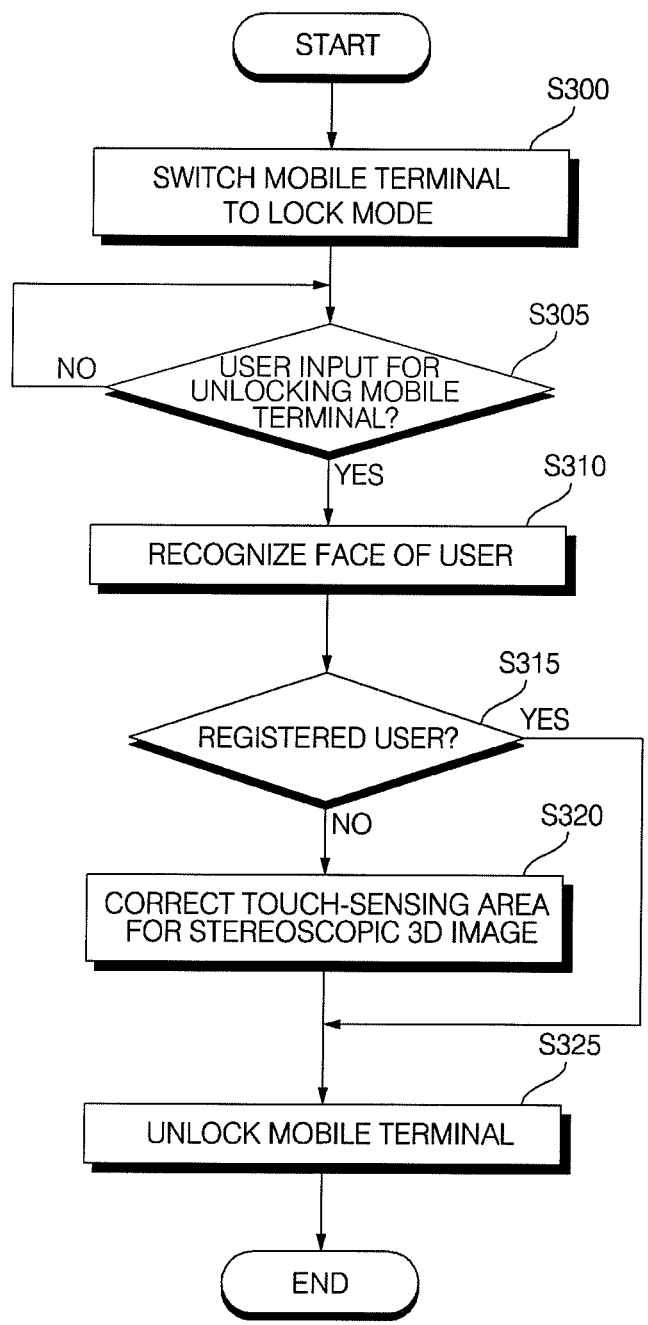
FIG. 5 is a flowchart illustrating a method of controlling the operation of a mobile terminal, according to another exemplary embodiment of the present invention.
Figure 6:
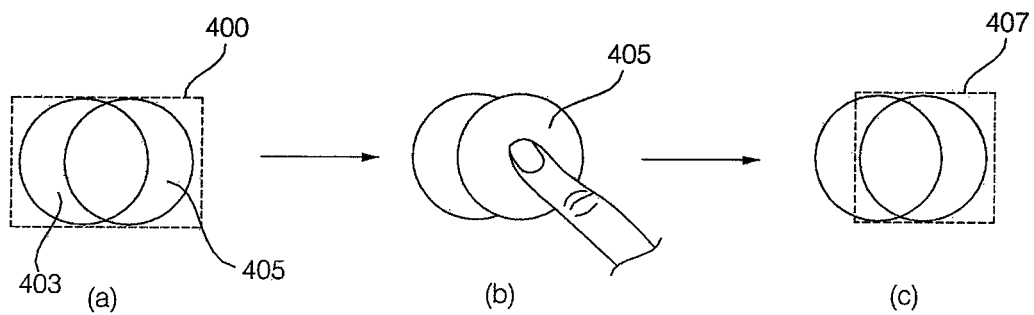
FIGS. 6 through 11 are diagrams illustrating an example of how to correct a touch-sensing area.
Figure 7:
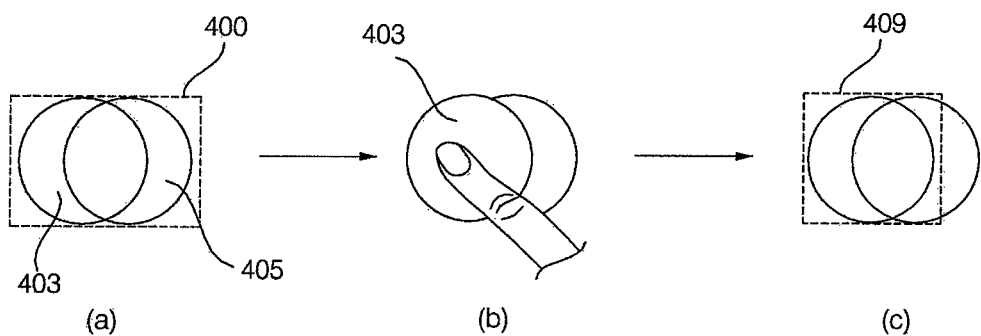
Figure 8:
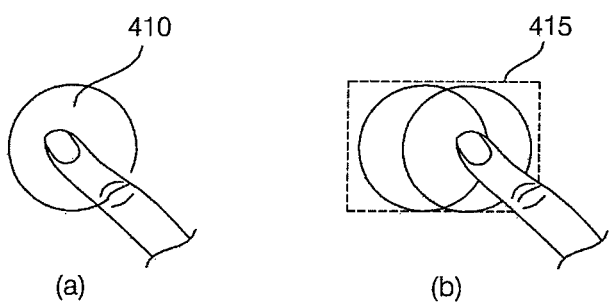

FIG. 5 is a flowchart illustrating a method of controlling the operation of a mobile terminal, according to another exemplary embodiment of the present invention, and particularly, how to set a new touch-sensing area for a new user. Referring to FIG. 5, the controller 180 may place the mobile terminal 100 in a protection mode or a lock mode when no touch or key input is detected for more than a predefined amount of time or when a lock command is received (S300). When placed in the lock mode, the mobile terminal 100 does not respond to any typical touch or key input until a particular user input for unlocking the mobile terminal 100 is received.

Thereafter, if the particular user input is received from a user (S305), the controller 180 may capture an image of the face of a person who has entered the particular user input and may perform face recognition using the captured image (S310). If the results of the face recognition performed in operation S310 indicate that the person who has entered the particular user input is a new user yet to be registered in the mobile terminal 100, the controller 180 may perform the correction of a touch-sensing area according to the dominant eye of the new user (S320). On the other hand, if the results of the face recognition performed in operation S310 indicate that the person has entered the particular user input is not a new user but an already-registered user, the method proceeds to operation S325.

More specifically, the correction of a touch-sensing area may be performed on a separate display screen, or may be performed as part of the unlocking of the mobile terminal 100. For example, a button or icon for unlocking the mobile terminal 100 may be displayed as a stereoscopic 3D image. Then, if a touch input or a touch-and-drag input is detected from the button or icon, it may be determined whether a person who has entered the touch input or the touch-and-drag input is a new user yet to be registered in the mobile terminal 100. Thereafter, if the person who has entered the touch input or the touch-and-drag input is determined to be a new user, the correction of a touch-sensing area may be performed.

Thereafter, the controller 180 may release the mobile terminal 100 from the lock state (S325).

In this manner, when unlocking the mobile terminal 100, it is possible to effectively correct a touch-sensing area even for a new user.

In this exemplary embodiment, the correction of a touch-sensing area is performed during the unlocking of the mobile terminal 100, but the present invention is not restricted to this. That is, the correction of a touch-sensing area may also be performed when the mobile terminal 100 is powered on, when a stereoscopic 3D image-related application is executed, when a password is entered, or when a frequently-used function is executed.

In this exemplary embodiment, it is determined whether a person who enters the particular user input is a new user through face recognition, and it is determined whether to perform the correction of a touch-sensing area according to the results of face recognition, but the present invention is not restricted to this. That is, it is determined whether a person who enters the particular user input is a new user based on a variation in capacitance resulting from the particular user input, given that the amount of the variation in capacitance varies from one user to another user.

For example, if a left-eyed person touches on a stereoscopic 3D image repeatedly when an area where a right-eye image of the stereoscopic 3D image is displayed is set as a touch-sensing area, a left side of the touch-sensing area may be touched repeatedly. Capacitance measurements may be obtained from the touch-sensing area in connection with each touch detected from the touch-sensing area, and may then be compared with a registered capacitance value. Then, if the results of the comparison indicate that the left-eyed person is a new user, the correction of the touch-sensing area may be automatically performed based on the average of the capacitance measurements as a background task.

The detection of a new user by comparing a capacitance value detected upon the receipt of a touch input with a registered capacitance value may also be performed when a touch-sensing area correction function is selected from a menu, when the mobile terminal 100 is powered on, when a stereoscopic 3D image-related application is executed, when the mobile terminal 100 is unlocked, and when a password is entered. Then, once a new user is detected, the correction of a touch-sensing area for a stereoscopic 3D image may be performed. More specifically, a popup menu asking the new user whether to perform the correction of a touch-sensing area may be displayed. Then, the correction of a touch-sensing area may be performed only when the new user chooses to perform the correction of a touch-sensing area. Alternatively, the correction of a touch-sensing area may be performed as a background task without the knowledge of the new user by analyzing the pattern of one or more touch inputs entered by the new user.

FIGS. 6 through 11 are diagrams illustrating an example of how to correct a touch-sensing area.

FIG. 6(a) is a diagram illustrating an example of a stereoscopic 3D image 400, which is realized based on the disparity between left- and right-eye images 403 and 405. Referring to FIG. 6(a), a left-eye image area in which the left-eye image 403 is displayed and a right-eye image area in which the right-eye image 405 is displayed are both initially set as a touch-sensing area. Thereafter, referring to FIG. 6(b), if a user touches on the right-eye image area as an attempt to touch on the stereoscopic 3D image 400, the controller 180 determines that the right-eye of the user is dominant. Then, referring to FIG. 6(c), the controller 180 sets a new touch-sensing area 407 based on the right-eye image area.

Similarly, referring to FIGS. 7(a) and 7(b), if the user touches on the left-eye image area as an attempt to touch on the stereoscopic 3D image 400, the controller 180 determines that the left-eye of the user is dominant. Then, referring to FIG. 7(c), the controller 180 sets a new touch-sensing area 409 based on the right-eye image area. If the user uses both eyes equally dominantly, the controller 180 may set a new touch-sensing area based on the overlapping area of the left- and right-eye image areas.

Referring to FIGS. 8(a) and 8(b), a stereoscopic 3D image 415 of a 2D image 410 may be displayed when a user touches on the 2D image 410. Then, when the user touches on the stereoscopic 3D image 415, the controller determines which of the left and right eyes of the user is dominant by comparing a touched part of the 2D image 410 and a touched part of the stereoscopic 3D image 415. Thereafter, the controller 180 corrects a touch-sensing area based on the results of the determination.

Figure 9:
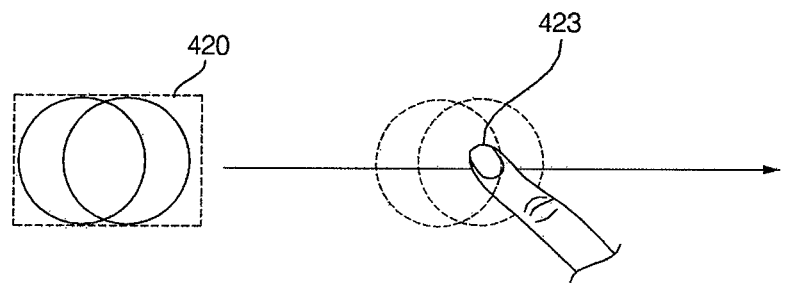

Referring to FIG. 9, if a touch 423 is detected within the stereoscopic 3D image 420 when the stereoscopic 3D image 420 is moving in a particular direction, the controller 180 may correct a touch-sensing area based on the position of the detection of the touch 423 within the stereoscopic 3D image 420. Alternatively, when the stereoscopic 3D image 420 is moved to a particular target location by a touch-and-drag, the controller 180 may connect a touch-sensing area based on the position of the detection of the touch-and-drag within the stereoscopic 3D image 420.

Figure 10:
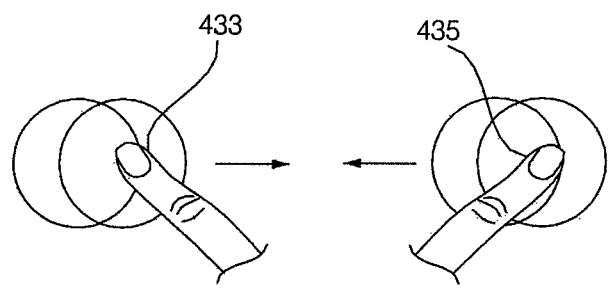
Figure 11:
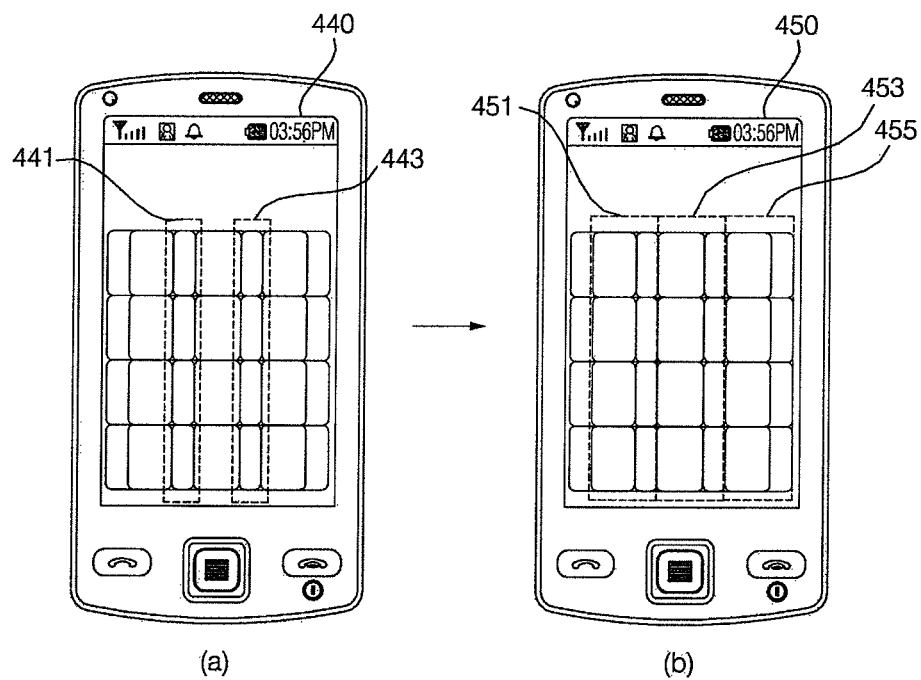

Referring to FIG. 10, if two stereoscopic 3D images are moved to a particular target location by a touch-and-drag 433 and a touch-and-drag 435, the correction of a touch-sensing area may be performed by analyzing the positions of the detection of the touch-and-drag 433 and the touch-and-drag 435 within the two stereoscopic 3D images.

Referring to FIG. 11(a), when multiple stereoscopic 3D images are displayed too close to one another on a display screen 440, touch-sensing areas for the multiple stereoscopic 3D images may overlap one another, as indicated by reference numerals 441 and 443, thereby making it difficult to select each of the multiple stereoscopic 3D images. FIG. 11(b) illustrates a display screen 450 obtained by correcting the touch-sensing areas based on the assumption that the dominant eye of a user is the right eye. Referring to FIG. 11(b), since touch-sensing areas 451, 453, and 455 do not overlap one another, each of the multiple stereoscopic 3D images can be easily selected.

Figure 12:
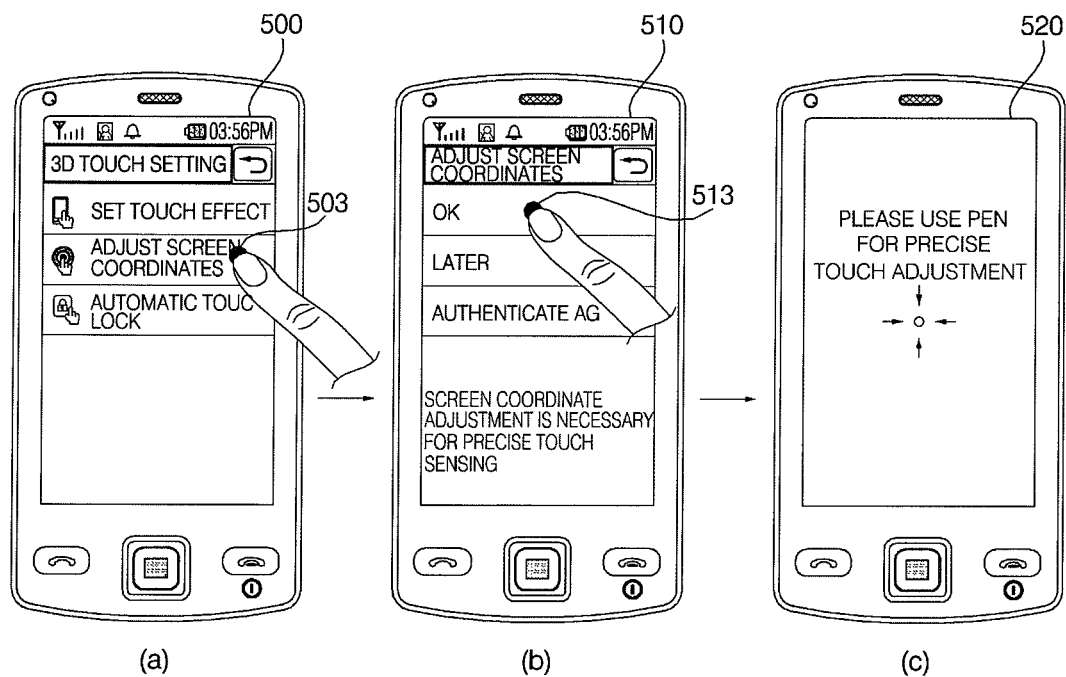
FIGS. 12 through 14 are diagrams illustrating an example of an operation performed in connection with a three-dimensional (3D) touch setting mode.
Figure 13:
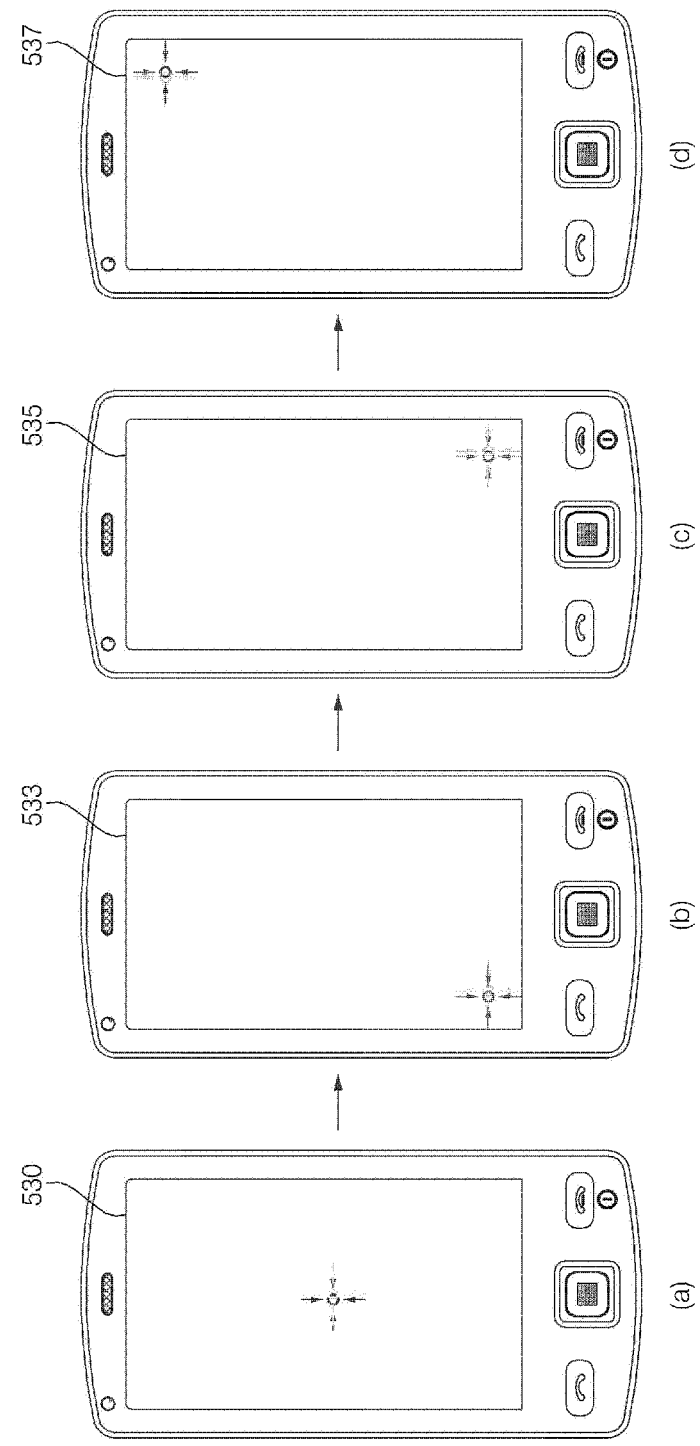
Figure 14:
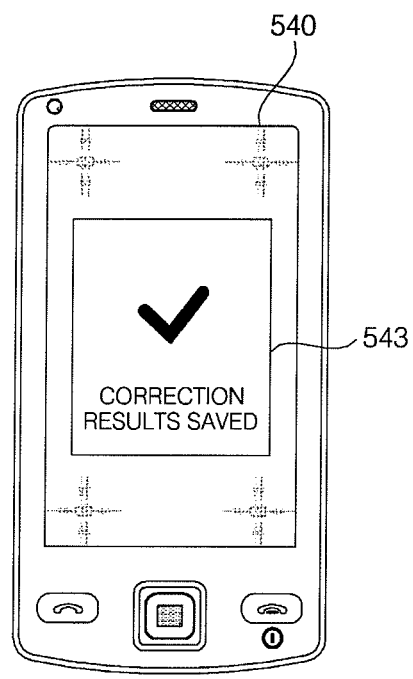
Figure 15:
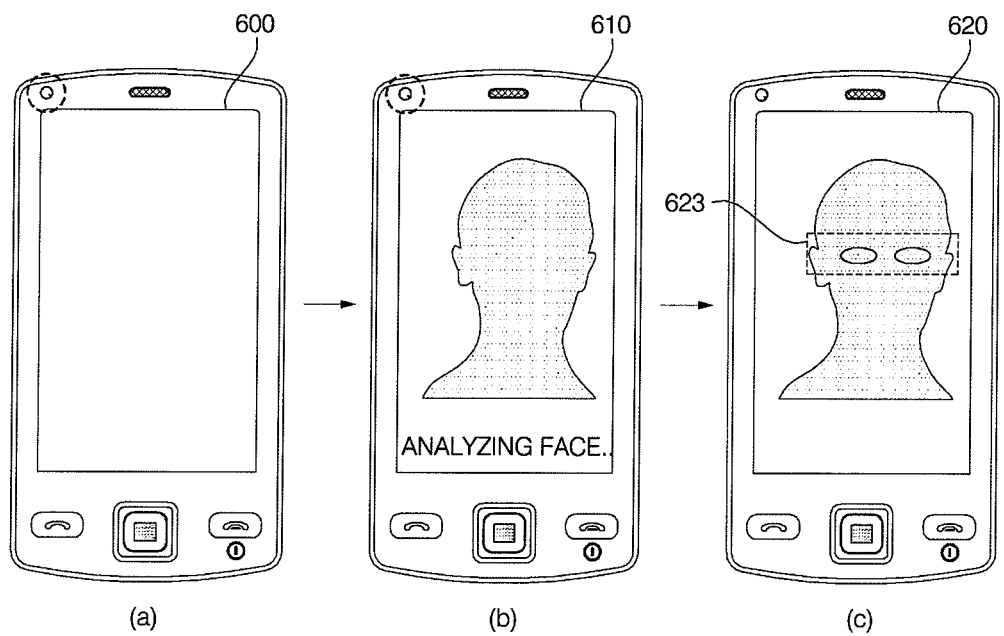
FIGS. 15 through 18 are diagrams illustrating an example of how to correct a touch-sensing area for a new user.

FIGS. 12 through 14 are diagrams illustrating an example of the operation of the mobile terminal 100 in connection with a 3D touch setting mode.

Referring to FIGS. 12(a) and 12(b), if an 'adjust screen coordinates' item 503 is selected from a '3D touch setting' screen 500, an 'adjust screen coordinates' screen 510 may be displayed. Then, if an 'OK' item 513 is selected from the 'adjust screen coordinates' screen 510, a display screen 520 for correcting a touch-sensing area may be displayed, as shown in FIG. 12(c).

Referring to FIGS. 13(a) through 13(d), the position of the display of a stereoscopic 3D image, which is marked as a cross, may be moved from the center of a display screen 530 for correcting a touch-sensing area to the lower left side, the lower right side, or to the upper right side of the display screen 530. Then, the stereoscopic 3D image may be moved accordingly. Thereafter, if a touch is detected within the stereoscopic 3D image, a touch-sensing area for the stereoscopic 3D image may be corrected based on the position of the detection of the touch.

Referring to FIG. 14, when the correction of a touch-sensing area is complete, a display screen 540 showing a message indicating that the results of the correction of the touch-sensing area are saved may be displayed. The results of the correction of the touch-sensing area can be used later for displaying another stereoscopic 3D image.

FIGS. 15 through 18 are diagrams illustrating an example of how to correct a touch-sensing area for a new user.

Referring to FIGS. 15(a) and 15(b), if a user input for unlocking the mobile terminal 100 is received when the mobile terminal 100 is locked, an image of the face of a person who has entered the user input may be captured using the first camera 121, which is disposed at the front of the mobile terminal 100, and a display screen 610 showing the captured image may be displayed. Thereafter, a display screen 620 for determining whether the person is a registered user through face recognition may be displayed. Face recognition may be performed by analyzing the positions of the eyes in the captured image, as indicated by reference numeral 623, but the present invention is not restricted to this. That is, face recognition may be performed based on the position of the nose or the mouth in the captured image.

Figure 16:
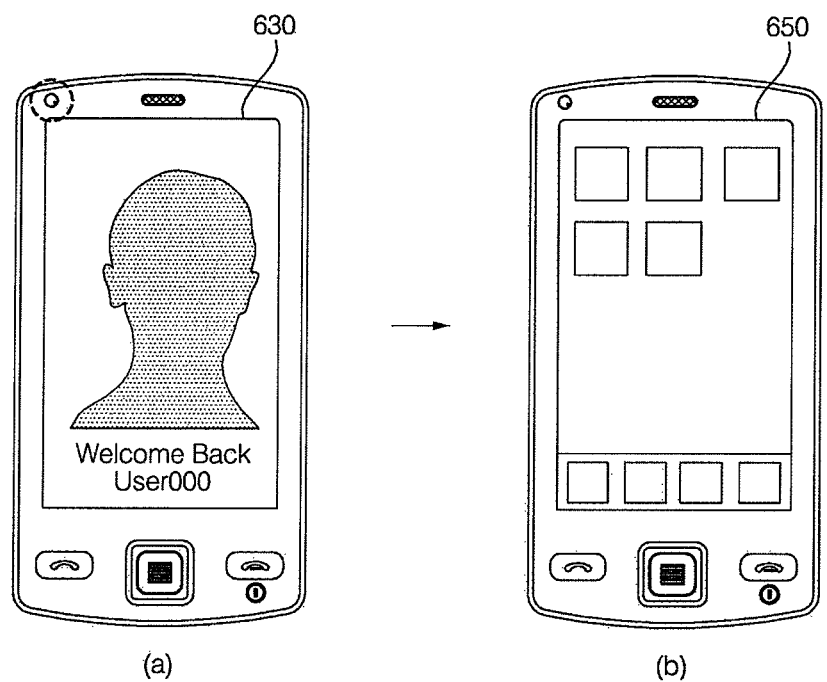

Referring to FIG. 16(*a*), if the person is determined to be a registered user, a display screen 630 may be displayed. Thereafter, referring to FIG. 16(*b*), the mobile terminal 100 may be automatically unlocked without a requirement of the correction of a touch-sensing area, and a display screen 650 that can be displayed when the mobile terminal 100 is unlocked may be displayed.

Figure 17:
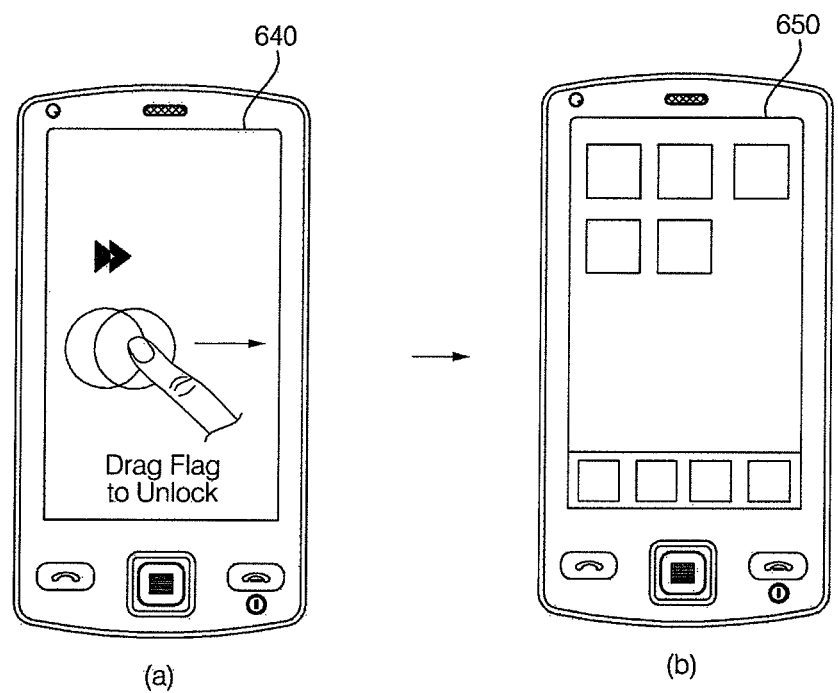

On the other hand, referring to FIG. 17(*a*), if the person is determined to be a new user yet to be registered in the mobile terminal 100, a display screen 640 for correcting a touch-sensing area may be displayed. Then, when the correction of a touch-sensing area is complete, the display screen 650 may be displayed, as shown in FIG. 17(*b*).

The detection of a new user may be performed not only through face recognition but also through the analysis of a capacitance value measured upon the detection of a touch from the display module 151. Alternatively, an 'unlock' icon for unlocking the mobile terminal 100 may be displayed as a stereoscopic 3D image. Then, if the 'unlock' icon is touched and dragged, it may be determined whether a person who has touched and dragged the 'unlock' icon is a new user yet to be registered by analyzing a part of the 'unlock' icon that has been touched by the person.

Figure 18:
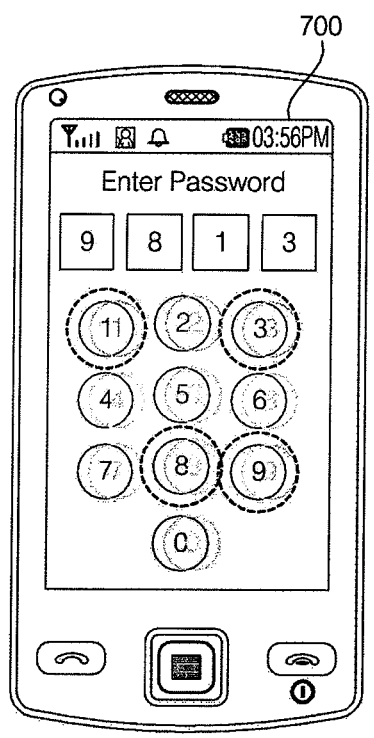

Referring to FIG. 18, number icons on an 'enter password' screen 700 for entering a password may be displayed as stereoscopic 3D images. Then, when a user enters a password by using the number icons, parts of the number icons that are touched by the user to enter the password may be analyzed, and the correction of a touch-sensing area may be automatically performed only when the results of the analysis indicate that the user is yet to be registered in the mobile terminal 100. The correction of a touch-sensing area may also be performed when an icon or a touch key for performing an alarm function or a messaging service, or making, receiving or ending a call is touched or when a menu or application icon is touched.

In short, the correction of a touch-sensing area may be effectively performed, without a requirement of a menu or display screen exclusively therefor, in accordance with a manipulation of the mobile terminal 100.

The mobile terminal according to the present invention and the method of controlling the operation of the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to effectively correct a touch-sensing area for a stereoscopic 3D image according to whether the dominant eye of a user is the right eye, the left eye or both. Therefore, it is possible to prevent a mobile terminal from malfunctioning in accordance with a touch detected within a stereoscopic 3D image.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling the operation of a mobile terminal, the method comprising:
    displaying, on a display module of the mobile terminal, a stereoscopic three-dimensional (3D) image using a disparity between left-eye and right-eye images;
    receiving a touch input within the stereoscopic 3D image;
    determining whether a position of the touch input is received within a first area of, a second area of or a third area of a touch-sensing area, wherein the right-eye image is displayed in the first area, the left-eye image is displayed in the second area, and the third area is an overlapping area of the left-eye and right-eye images;
    correcting the touch-sensing area on the display module according to the position of the received touch input, wherein the touch-sensing area receives a touch for selecting the stereoscopic 3D image; and
    setting a new touch-sensing area based on the corrected touch sensing area;
    wherein when the position of the received touch input is within the first area, a dominant eye is determined to be a right eye of a user, and the new touch-sensing area is set based on the first area,
    when the position of the received touch input is within the second area, the dominant eye is determined to be a left eye of the user, and the new touch-sensing area is set based on the second area, and
    when the position of the received touch input is within the third area, both eyes of the user are determined to be dominant, and the new touch-sensing area is set based on the third area.

2. The method of claim 1, further comprising:
    storing, in a memory of the mobile terminal, the new touch-sensing area.

3. The method of claim 1, wherein the correcting the touch-sensing area comprises correcting the touch-sensing area in one of the following cases:
    when a 3D touch setting mode is executed;
    when the mobile terminal is powered on;
    when the mobile terminal is unlocked;
    when a stereoscopic 3D image-related application is executed; and
    when a password is entered.

4. The method of claim 1, further comprising:
    varying the position of the stereoscopic 3D image on the display module at predetermined time intervals.

5. A mobile terminal comprising:
    a display module configured to display a stereoscopic three-dimensional (3D) image using a disparity between left-eye and right-eye images; and
    a controller configured to:
    receive a touch input within the stereoscopic 3D image, determine whether a position of the touch input is received within a first area of, a second area of, or a third area of a touch-sensing area, wherein the right-eye image is displayed in the first area, the left-eye image is displayed in the second area, and the third area is an overlapping area of the left-eye and right-eye images, correct the touch-sensing area on the display module according to the position of the touch input, wherein the touch-sensing area receives a touch for selecting the stereoscopic 3D image, and set a new touch-sensing area based on the corrected touch-sensing area, wherein when the position of the received touch input is within the first area, the controller is further configured to determine a right eye of a user as a dominant eye, and set the new touch-sensing area based on the first area, when the position of the received touch input is within the second area, the controller is further configured to determine a left eye of the user as the dominant eye, and set the new touch-sensing area based on the second area, and when the position of the received touch input is within the third area, the controller is further configured to determine both eyes of the user as the dominant eye, and set the new touch-sensing area based on the third area.

6. The mobile terminal of claim 5, further comprising:
a memory to store the new touch-sensing area.

7. The mobile terminal of claim 5, wherein the controller is further configured to correct the touch-sensing area based on whichever of the first, second and third areas includes the position of the detection of the touch.

* * * * *